United States Patent [19]

Albee

[11] 3,953,799

[45] Apr. 27, 1976

[54] BROADBAND VLF LOOP ANTENNA SYSTEM

[75] Inventor: Thomas K. Albee, Western Springs, Ill.

[73] Assignee: The Bunker Ramo Corporation, Oak Brook, Ill.

[22] Filed: Apr. 9, 1971

[21] Appl. No.: 132,895

Related U.S. Application Data

[63] Continuation-in-part of Ser. No. 769,861, Oct. 23, 1968, abandoned.

[52] U.S. Cl. .............................. 325/376; 333/80 T; 343/701

[51] Int. Cl.² .............................. H04B 1/18

[58] Field of Search ........... 325/365, 373, 374, 376, 325/381, 382, 383, 385, 387, 427; 343/700, 722, 745, 748; 179/170 R, 170 G; 333/24.1, 80 R, 807

[56] References Cited

UNITED STATES PATENTS

| | | | |
|---|---|---|---|
| 2,650,303 | 8/1953 | Schlesinger | 343/748 X |
| 3,042,759 | 7/1962 | Bonner | 179/170 G |
| 3,243,739 | 3/1966 | Sziklai | 330/80 |
| 3,243,740 | 3/1966 | Sziklai | 330/80 |
| 3,243,743 | 3/1966 | Sziklai | 330/80 X |
| 3,550,137 | 12/1970 | Kuecken | 343/748 |

*Primary Examiner*—Benedict V. Safourek
*Attorney, Agent, or Firm*—F. M. Arbuckle

[57] ABSTRACT

A loop antenna system including a negative reactance circuit and having a bandwidth of several octaves in the low frequency bands.

4 Claims, 2 Drawing Figures

Figure 2:
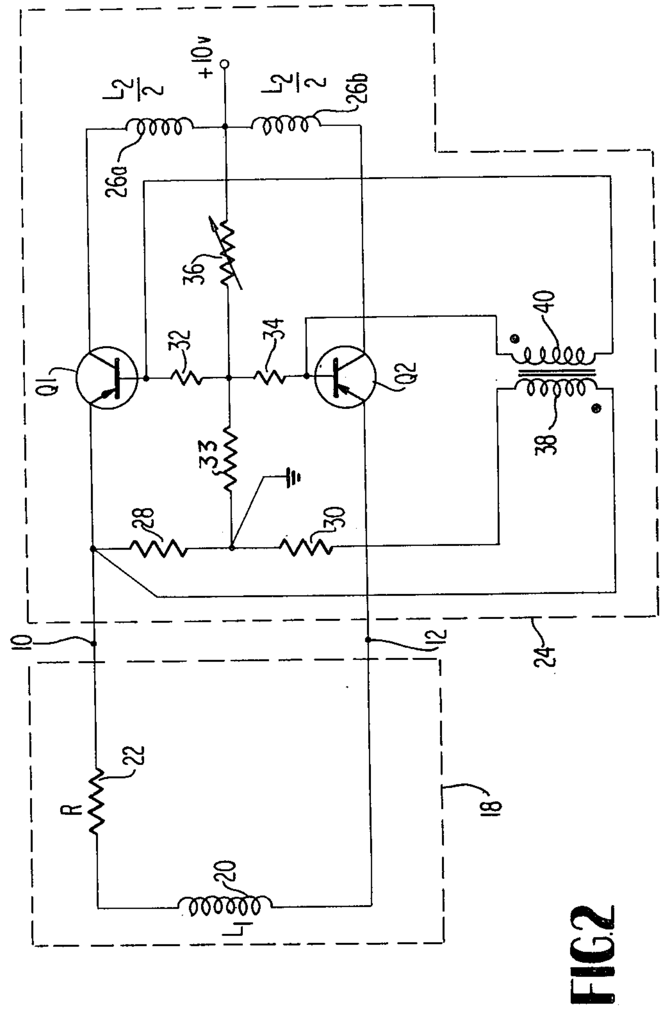

INVENTOR
THOMAS K. ALBEE

BY Burns, Doane, Benedict, Swecker & Mathis
ATTORNEYS

BROADBAND VLF LOOP ANTENNA SYSTEM

RELATED APPLICATIONS

This application is a continuation-in-part of application Ser. No. 769,861 filed Oct. 23, 1968 for "Broadband VLF Loop Antenna", now abandoned.

BACKGROUND OF THE INVENTION

Long range radio communication equipment often operates at frequencies within the L.F. (low frequency) and V.L.F. (very low frequency) bands, hereinafter referred to collectively as the "low frequency bands." Submarine radio systems, for example, usually utilize carrier frequencies within the range of approximately three kilohertz to three hundred kilohertz since the underwater propagation of radio signals is particularly practical at these frequencies. The utilization of a frequency of twenty kilohertz is common within this band.

Fixed or rotatable loop antennas are generally employed with such low frequency radio communication systems. Antennas of this type have been found to have relatively good performance characteristics in a water environment with respect to parameters such as signal-to-noise ratio, directivity paterns, and signal strength.

Tuning of the antenna for operation at a specific frequency within the band is customarily accomplished by modifying the reactance of a variable capacitive impedance element. This variable capacitive reactance element is normally connected across the loop antenna to allow the selective tuning of the antenna for operation at a particular frequency with the band. Because wavelength is inversely proportional to frequency, both the loop antenna and the variable capacitive reactance element in communication systems operating within the low frequency bands require relatively large inductive and capacitive values. Large physical dimensions are, of course, generally required to obtain these large inductive and capacitive values.

In an application Ser. No, 556,790, filed June 10, 1966, now U.S. Pat. No. 3,528,014, the low frequency communication systems then known, and particularly the underwater V.L.F. radio receiving systems then known, were modified by supplementing the variable tuning capacitive reactance with a variable negative impedance. While an output signal amplitude greater than that of similar antenna systems then known resulted, the increase in signal strength was accompanied by a smaller operating bandwidth.

It is accordingly an object of the present invention to provide a novel frequency independent antenna.

It is another object of the present invention to provide a novel method and apparatus for increasing the effective bandwidth of a loop antenna.

Yet another object of the present invention is to effect the aforementioned increase in effective operating bandwidth by the insertion in such antenna systems of circuit means having relatively small physical size and weight.

A further object of the present invention is to provide a novel method and apparatus for increasing the terminal signal voltage of a loop antenna system operating in the low frequency bands while maintaining broadband selectivity.

A still further object of the present invention is to provide a novel method and apparatus for obviating the necessity for tuning an antenna with a capacitor.

Yet a further object of the present invention is to provide a novel method for tuning a loop antenna to a range of frequencies extending over several octaves.

Briefly, the present invention contemplates accomplishing the foregoing objects by coupling a negative inductive reactance circuit means with a loop antenna system to effectively cancel the effects of frequency on the inductive reactance of the loop antenna. In the embodiment described, the antenna is a plural turn inductor which is capable of radiating electromagnetic energy in the low frequency bands. By providing a negative inductive reactive circuit in conjunction with an antenna which inherently has inductance, the antenna becomes broadband and the necessity of tuning the antenna to an individual frequency is obviated. The resultant signal provided by the antenna system of the present invention is fed to the active input stage of the receiver for processing in a conventional manner.

These and many other objects and advantages will be readily apparent to one skilled in the art to which the invention pertains from the following description of a preferred embodiment when read in conjunction with the accompanying drawings.

THE DRAWINGS

Figure 1:
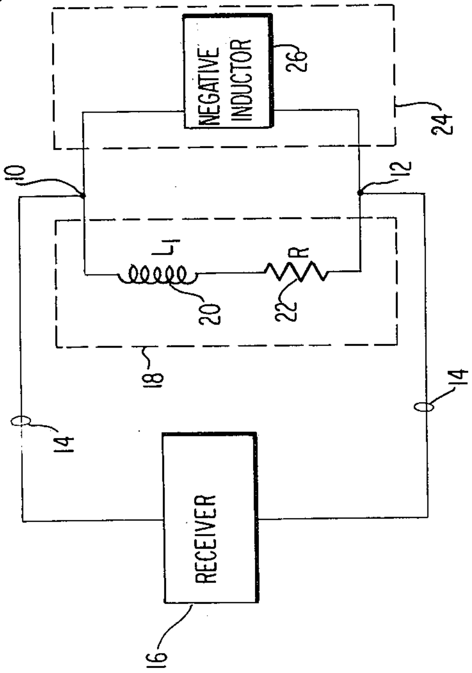

FIG. 1 is a functional schematic diagram of the antenna system of the present invention with the negative inductive reactance in block form; and, FIG. 2 is an equivalent schematic circuit diagram of the antenna system shown in FIG. 1.

THE PREFERRED EMBODIMENT

Referring now to FIG. 1 of the drawings, a pair of antenna system output terminals 10 and 12 are connected by means of leads 14 to a complete and conventional radio receiver system 16. The VLF loop antenna 18 is connected across the terminals 10 and 12 and is represented schematically by an inductor 20 and a resistor 22. The antenna 18 may, of course, take any of a number of conventional loop antenna configurations but will generally comprise a large number of wire turns wound around a relatively large support in order to provide a sufficient effective antenna length for signal reception in the low frequency bands.

A significant value of resistance is introduced into the antenna by the length of the wire and additional resistances may also appear in the circuit. In submarine signaling applications, for example, the antenna 18 will generally be located at a substantial distance from the receiver 16 and the leads 14 may therefore be several hundred feet in length. While the leads 14 are electrically very short when compared to the wavelengths of the signals in the low frequency bands, they may constitute a material resistance which may be lumped together for convenience with the resistance of the antenna shown schematically as a resistor 22.

Connected in parallel with the loop antenna 18 across the terminals 10 and 12 is a variable negative inductive reactance circuit 24. Although shown schematically as a negative inductor 26 being connected immediately adjacent the loop antenna 18, the negative inductive reactance circuit 24 may be connected at other positions along the leads 14.

With continued reference to FIG. 1, the input impedance Z seen looking at the terminals 10 and 12 from the conventional receiver 16 may be expressed as:

$$Z = \frac{(R + jX_{L_1})(-jX_{L_2})}{R + jX_{L_1} - jX_{L_2}} \quad (1)$$

where R is the resistance of the resistor 22, $L_1$ is the inductance of the inductor 20, and $-L_2$ is the inductance of the negative inductor 26.

If the absolute value of the inductive reactance of the loop 20 and the inductor 24 are made equal, i.e., $X_{L_1} = X_{L_2}$, equation (1) may be reduced to:

$$Z = \frac{X_L^2}{R} - jX_L \quad (2)$$

Resonance may be defined as equal capacitive and inductive reactances. With both capacitive and inductive reactances this is true at only one frequency. Since in equation (1) the reactances $X_{L_1}$ and $X_{L_2}$are equal and opposite in sign, the resultant is thus a resonant circuit. Inasmuchas the inductive reactance $X_{L_1}$ varies directly with frequency f according to the equation:

$$X_{L_1} = 2\pi f L_1 \quad (3)$$

and the inductive reactance $X_{L_2}$also varies directly with frequency f according to the equation:

$$X_{L_2} = 2\pi f(-L_2) \quad (4)$$

The antenna circuit is therefore independent of frequency and does not require tuning for transmission over a range of frequencies including several octaves.

With respect to negative inductive reactance circuit 24, many circuits have been designed to convert positive impedance into effective negative impedances by coupling the output terminal of an amplifier back into its own input terminal. While any one of a plurality of well-known negative impedance circuits may be utilized in the present invention, a preferred embodiment has been schematically illustrated in FIG. 2.

Referring now to FIG. 2, the circuit 24, as will be understood by those skilled in the art, is a balanced type of negative impedance converter which employs cross-coupling feedback between two interconnected transistors Q1 and Q2. The two transistors and their associated circuit components are symmetrically disposed and commonly connected so that the output terminal of each transistor is coupled to the common connection of the other, thereby providing phase inverting feedback. The resulting magnitude of the negative inductive reactance presented by the circuit 24 depends upon the portion of the voltage supplied across the circuit which is cross-coupled between the transistors, and accordingly, the circuit 24 includes several variable bias adjustments for adjustment of the negative impedance. For a detailed description of the negative reactance circuit 24, reference may be had to the article by J. G. Linvill appearing in 41 "I.R.E. Proceedings,"726–729, June, 1953.

Exemplary values for the various circuit components of the circuit of FIG. 2 are as follows:

| | |
|---|---|
| Resistor 22 | 10 ohms |
| Resistors 28 and 30 | 2.2 K ohms |
| Resistors 32 and 34 | 10 K ohms |

-continued

| | |
|---|---|
| Resistor 33 | 1 K ohm |
| Potentiometer 36 | 10 K ohms |
| Inductors 20 and 26 | 1 millihenry |
| Inductor 38 | 10 millihenry |
| Inductor 40 | 100 millihenry |

Although the improved antenna system of the present invention has thus far been described and illustrated with the negative inductive reactance circuit connected in parallel circuit across the output terminals of the antenna loop, similar improvements in antenna system parameters may be obtained by inserting a suitably designed negative inductive reactance circuit in a series circuit with the loop antenna.

Although a preferred embodiment of the invention has been described herein, it will be readily apparent that many modifications could be made in the disclosed method and apparatus without departing from the scope of the invention. Accordingly, it is intended that all matter contained in the above description or shown in the accompanying drawings shall be interpreted as illustrative and not in a limiting sense, and that the scope of the invention be limited only by the language of the appended claims when accorded a full range to equivalents.

What is claimed is:

1. A broadband antenna system capable of operation over an operating band of a plurality of octaves in the low frequency bands ranging from approximately three kilohertz to three hundred kilohertz without requiring tuning to resonance for individual frequencies within the band, said antenna system comprising:

an antenna adapted for antenna operation in said low frequency bands, said antenna having an inherent inductance $L_1$ providing an inductive reactance $X_{L_1}$ which varies with frequency f over said operating band in accordance with the equation $X_{L_1} = 2\pi f L_1$, and a negative inductive reactance circuit electrically coupled in parallel with said antenna and having a negative inductance $-L_2$ chosen to provide a negative inductive reactance $X_{L_2} = 2\pi f(-L_2)$ over said operating band which is substantially equal to the inductive reactance $X_{L_1}$ provided by said inherent inductance.

2. The invention in accordance with claim 1, wherein said antenna is a loop antenna comprising a large number of wire turns wound around a large support so as to provide sufficient effective antenna length for operation in said low frequency bands.

3. The invention in accordance with claim 2, wherein said negative inductive reactance circuit comprises a balanced type of negative impedance converter employing a pair of transistors interconnected for cross-coupling phase inverting feedback.

4. The invention in accordance with claim 3, wherein each of said transistors has emitter, collector and base electrodes, wherein the emitter electrodes of said transistors are connected to each other through an inductor, wherein the collector electrodes of each of said transistors are transformer coupled to the base electrodes of the other of said transistors, and wherein the inductance of said inductor has an inductance substantially equal to said inherent inductance of said antenna.

* * * * *